US010201771B2

(12) United States Patent
Malgorn et al.

(10) Patent No.: US 10,201,771 B2
(45) Date of Patent: Feb. 12, 2019

(54) GASKET HAVING AN INTEGRAL DRAIN (71) Applicant: Cummins Filtration IP, Inc., Columbus, IN (US)

(72) Inventors: Gérard Malgorn, Ergué Gabéric (FR); Stéphane Simon, Guengat (FR); Stéphane Le Guyader, Briec (FR); Wassem Abdalla, Cookeville, TN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 104 days.

(21) Appl. No.: 15/318,642

(22) PCT Filed: Jun. 19, 2015

(86) PCT No.: PCT/US2015/036695
§ 371 (c)(1),
(2) Date: Dec. 13, 2016

(87) PCT Pub. No.: WO2015/200130
PCT Pub. Date: Dec. 30, 2015

(65) Prior Publication Data
US 2017/0128862 A1 May 11, 2017

(30) Foreign Application Priority Data

Jun. 24, 2014 (FR) .................................... 14 55833

(51) Int. Cl.
*B01D 35/16* (2006.01)
*B01D 27/08* (2006.01)
(Continued)

(52) U.S. Cl.
CPC .......... *B01D 35/005* (2013.01); *B01D 27/08* (2013.01); *B01D 35/153* (2013.01); *B01D 35/16* (2013.01);
(Continued)

(58) Field of Classification Search
CPC ...... B01D 35/005; B01D 35/16; B01D 27/08; B01D 2201/347; B01D 2201/316;
(Continued)

(56) References Cited

U.S. PATENT DOCUMENTS 3,493,110 A 2/1970 Rosaen
4,167,483 A 9/1979 Rosaen et al.
(Continued)

FOREIGN PATENT DOCUMENTS

CN 201505483 U 6/2010
CN 201889121 U 7/2011
(Continued)

OTHER PUBLICATIONS

English Translation of French Search Report and Written Opinion for French Patent Application No. 14 55833 dated Mar. 13, 2015, 4 pages.
(Continued)

*Primary Examiner* — Madeline Gonzalez
(74) *Attorney, Agent, or Firm* — Foley & Lardner LLP (57) ABSTRACT A filtration system is described. The filtration system includes a filter housing having a central tube and a replaceable filter element. The central tube includes a gasket that plugs a passage from the dirty side of the filter element to the clean side of the filter element when the filter element is installed in an operational position. The gasket includes an integrated drain extending through the gasket. The gasket is integrated into the central tube and stays in place when the filter element is removed (e.g., during replacement of the filter element). The removal of the filter element opens the drain to allow for the draining of the fluid from the housing to the tank. The gasket is reusable and does not need to be replaced with each filter element replacement.

15 Claims, 7 Drawing Sheets (51) Int. Cl.
*B01D 35/00* (2006.01)
*B01D 35/153* (2006.01)

(52) U.S. Cl.
CPC ............... *B01D 2201/0415* (2013.01); *B01D 2201/291* (2013.01); *B01D 2201/305* (2013.01); *B01D 2201/316* (2013.01); *B01D 2201/347* (2013.01); *B01D 2201/4084* (2013.01)

(58) Field of Classification Search
CPC ...... B01D 2201/305; B01D 2201/0415; B01D 2201/291
USPC .............................................. 210/450, 493.2
See application file for complete search history.

(56) References Cited

U.S. PATENT DOCUMENTS

| | | |
|---|---|---|
| 5,453,184 A | 9/1995 | Handtmann |
| 5,587,066 A | 12/1996 | Covington |
| 6,543,625 B1 | 4/2003 | Le Roux et al. |
| 7,357,865 B1 | 4/2008 | Nader |
| 7,422,119 B2 | 9/2008 | Malgorn et al. |
| 2002/0108897 A1 | 8/2002 | Pavlin et al. |
| 2011/0084016 A1* | 4/2011 | Le Roux .............. B01D 35/153 210/441 |

FOREIGN PATENT DOCUMENTS

| | | |
|---|---|---|
| GB | 1 003 463 | 9/1965 |
| WO | WO 02/076569 | 10/2002 |
| WO | WO 2009/115605 | 9/2009 |

OTHER PUBLICATIONS

Search Report and Written Opinion for PCT/US2015/036695, dated Sep. 17, 2015, 6 Pages
Office Action issued for Chinese Patent Application No. 201580032025. 2, dated Feb. 4, 2018.

* cited by examiner

GASKET HAVING AN INTEGRAL DRAIN

CROSS REFERENCE TO RELATED APPLICATIONS

This present application is a National Stage of PCT Application No. PCT/US2015/036695, filed Jun. 19, 2015, which claims the benefit of and priority to French Patent Application No. 1455833, filed Jun. 24, 2014. The contents of both applications are herein incorporated by reference in their entirety.

TECHNICAL FIELD

This application relates generally to filtration systems.

BACKGROUND

An internal combustion engine typically includes fluid filtration systems, such as fuel filtration systems, lubricant filtration systems, hydraulic oil filtration systems, and the like. Each filtration system removes particulate, water, and other impurities in the fluids. The filtration system generally includes a replaceable filter element that includes a filter media. In addition to the filter media, the filter element also includes support and frame members (e.g., endcaps, media support members, etc.) and a gasket that seals the dirty side of the filter media from the clean side of the filter media when the filter element is positioned in an installed position within a fuel filter housing. One such gasket, which includes a generally x-shaped cross section, is described in U.S. Pat. No. 6,543,625, entitled "CARTRIDGE FOR FILTERING A LIQUID CIRCULATING IN A HYDRAULIC ENGINE OR EQUIPMENT AND CORRESPONDING FILTERING CARTRIDGE-SEALING JOINT ASSEMBLY".

As the filter element filters the fluid, the filter media captures and retains particulate, which increases the restriction of the filter system. Accordingly, the filter element of the filtration system is replaced at regular intervals to prevent choking of the fluid supply to the engine or component. During replacement, the used filter element, including the used filter media and gasket, are replaced with a new filter element, including new filter media and a new gasket. The used filter element is discarded or recycled.

During a filtration system service (e.g., a filter element service as described above), fluid may spill as the filter element is removed from the filter housing. In particular, residual fluid may be retained between the gasket and a filter element frame member and between the filter element and the housing walls. The residual fluid may leak when the filter element is removed. Prior filtration systems utilize a gasket coupled to the filter element that have a drain that allows the residual fluid to flow back to a fluid storage tank (e.g., a fuel tank) before removing the filter element from the filter housing. When the filter element is removed during the service, the gasket is removed with the filter element allowing the fluid in the housing to drain back to the tank. The draining function takes place while the lid of the housing is being spun off the housing and before pulling the filter element out of the housing. Since the gasket having the drain is integrated into the filter element, the gasket is discarded with the filter element after use. This results in added costs for each replacement filter element because the replacement filter element needs to include another seal for the filtration system to function properly.

SUMMARY

One embodiment of the invention relates to a filter assembly. The filter assembly includes a housing having a central tube and a gasket positioned on the central tube. The gasket includes a drain passage extending there through. The gasket further includes a sealing lobe. The filter assembly includes a filter element removably positioned within the housing. The filter element includes a filter media and an endcap. The filter media is configured to filter a fluid. The endcap includes an extension portion that contacts the sealing lobe and forms a seal with the gasket when the filter element is positioned in an operating position within the housing. The extension portion blocks the drain passage when the filter element is positioned in the operating position. When the filter element is removed from the operating position, the drain passage is not blocked by the extension portion such that the fluid can flow through the drain passage.

These and other features, together with the organization and manner of operation thereof, will become apparent from the following detailed description when taken in conjunction with the accompanying drawings.

DETAILED DESCRIPTION

Referring to the figures generally, a filtration system is shown. The filtration system includes a filter housing having a central tube (e.g., a standpipe) and a replaceable filter element. The central tube includes a gasket that plugs a passage from the dirty side of the filter element to the clean side of the filter element when the filter element is installed over the central tube in an operational position. The gasket includes an integrated drain passage or channel extending through the gasket. Since the gasket is integrated into the central tube of the filter housing, the gasket stays in place when the filter element is removed (e.g., by an operator during a service on or replacement of the filter element). The removal of the filter element opens the passage through the gasket to allow for the draining of the filtered fluid the housing back to a storage tank during the service operation. Accordingly, the gasket is reusable and does not need to be replaced with each filter element replacement, thereby reducing the amount of parts, the amount of waste, and the cost of the above described filtration systems. In some arrangements, the gasket is comprised of a material that does not experience expansion or contraction due to the exposure of the gasket to the fluid being filtered (e.g., an automotive fluid such as fuel or oil, water, etc.). The material allows the reuse of the seal.

Figure 1:
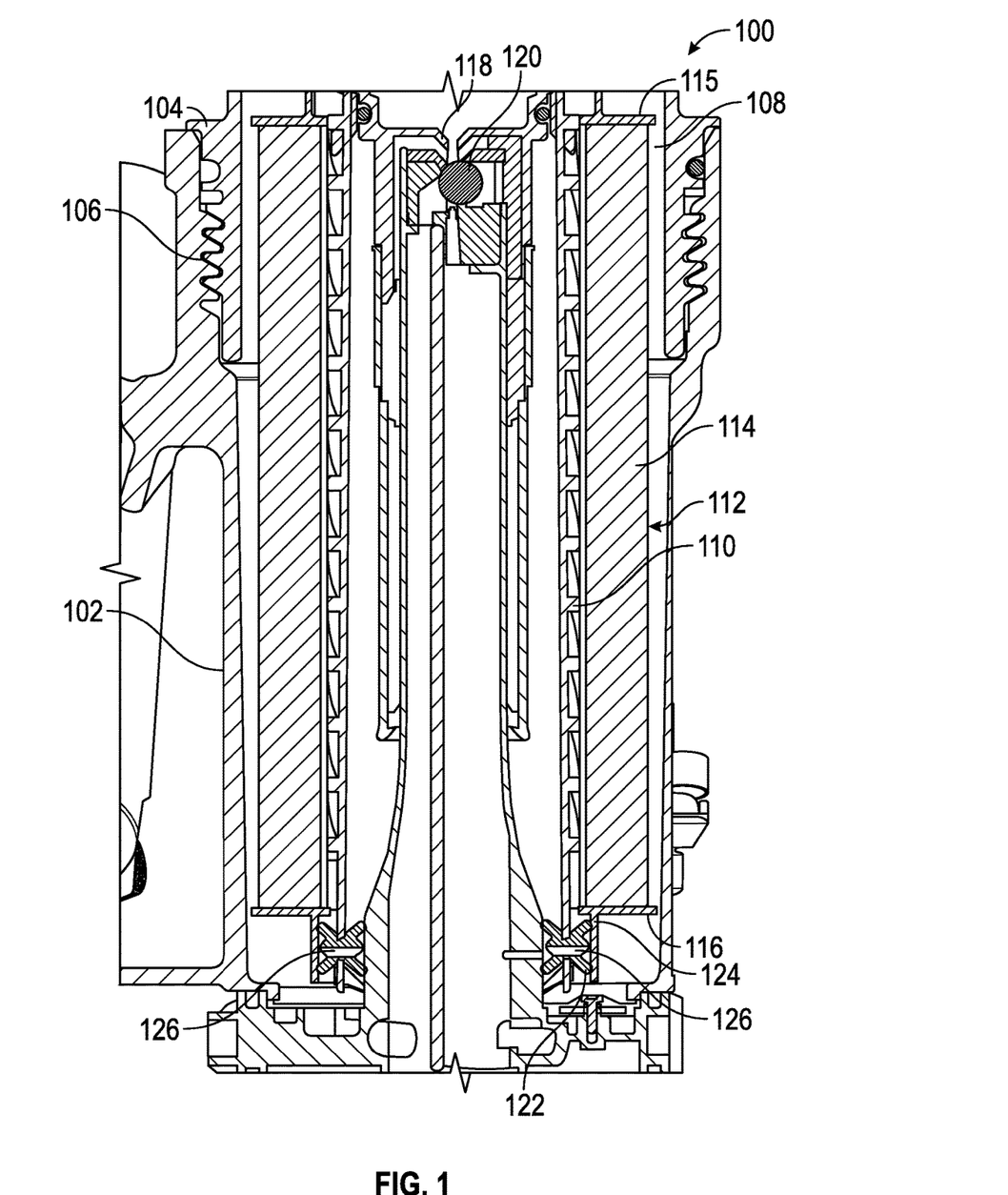
FIG. 1 is a cross-sectional view of a filter assembly according to an exemplary embodiment.

Referring to FIG. 1, a cross-sectional view of a filter assembly 100 is shown according to an exemplary embodiment. The filter assembly 100 includes a lower housing 102 and an upper housing 104. The upper housing 104 is removably connected to the lower housing 102 through a threaded connection 106. The lower housing 102 and upper housing 104 form a substantially cylindrical cavity 108 (as seen best in FIG. 4). The housing includes a central tube 110 (e.g., a standpipe). A cylindrical filter element 112 is removably received in the cavity 108 and over the central tube 110. The filter element 112 includes a filter media 114 arranged in a cylindrical manner and positioned between a first endcap 115 and a second endcap 116. The second endcap 116 is an open endcap such that the filter element 112 can be received over the central tube 110. The first endcap is 115 is a closed endcap that seals the dirty side of the filter media 114 (the side of the filter media 114 facing the housing wall) from the clean side of the filter media 114 (the side of the filter media facing the central tube 110). In some arrangements, the first endcap 115 includes a valve interaction device 118 that interacts with a valve 120 positioned in an operating position (as shown in FIG. 1) within the central tube 110. The valve 120 controls (e.g., allows or prevents) the flow of fluid to be filtered (e.g., fuel) from a fluid storage tank into the filter assembly 100 in fluid communication with the filtration system 100.

The central tube 110 includes a gasket 122. The gasket 122 provides a seal between the second endplate 116 and the central tube 110 when the filter element 112 is positioned in the operating position. The second endplate 116 includes an extension portion 124 that provides a sealing surface for the gasket 122. As described in further detail below, the gasket 122 includes a plurality of openings 126 (e.g., drain passages or channels) that allow for the draining of fluid back to the fluid storage tank during service operations, such as replacement of the filter element 112. The plurality of openings extend through the gasket 122. The plurality of openings 126 are in fluid communication with the fluid storage tank. The plurality of openings 126 are blocked by the extension portion 124 of the second endplate 116 when the filter element 112 is in the operating position. It should be noted that, while the gasket 122 depicted in FIG. 1 includes multiple openings 126, it is also possible for the gasket to include or define only a single opening 126 defining a single drain passage or channel.

Figure 2:
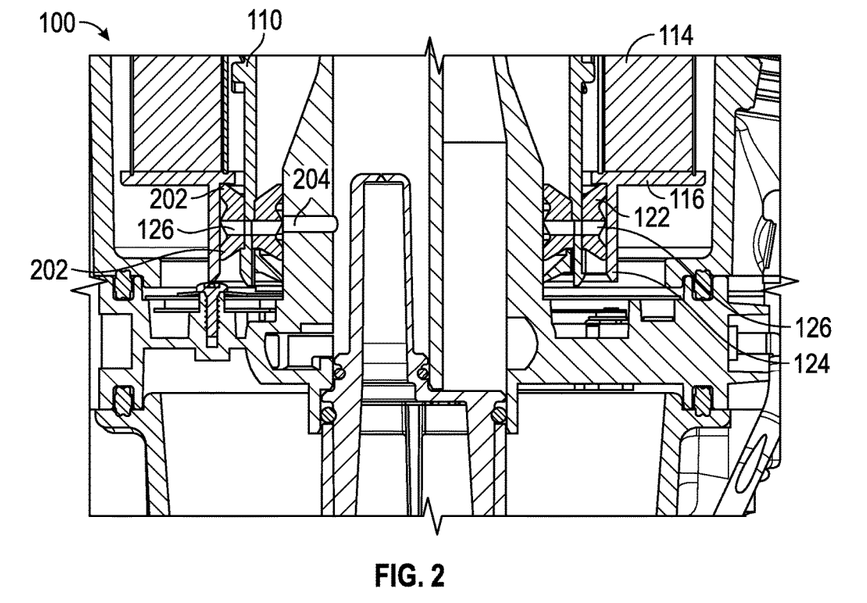
FIG. 2 is a close-up cross-sectional view of the filter assembly of FIG. 1.

FIG. 2 shows a close-up cross-sectional view of the filter assembly 100 near the gasket 122. As shown in FIG. 2, the filter element 112 is in the installed or operating position. The gasket 122 includes a plurality of lobes 202 that contact the extension portion 124 of the second endplate 116 when the filter element 112 is in the operating position thereby creating a seal between the gasket and the extension portion 124. The extension portion 124 blocks the plurality of openings 126 and prevents the flow of filtered fluid from backtracking into the fluid storage tank through a drainage outlet 204.

Figure 3:
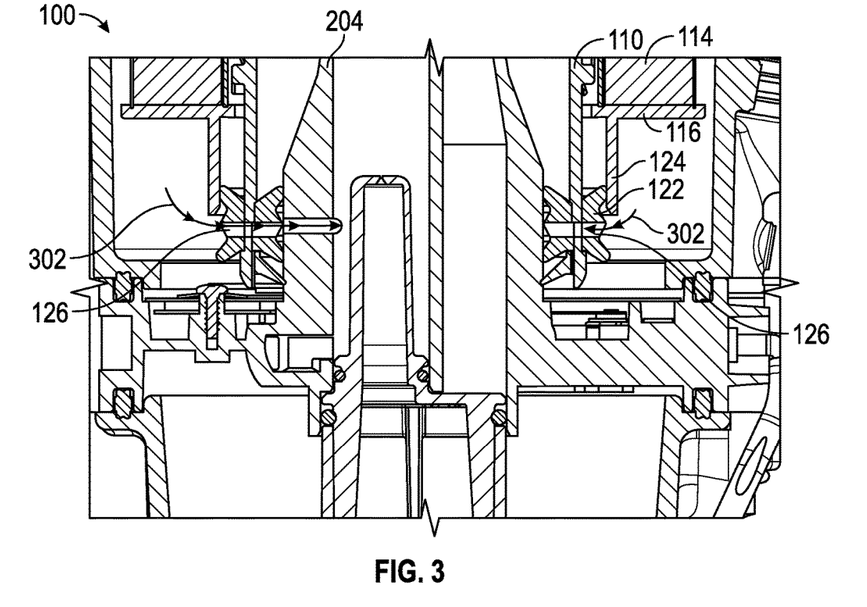
FIG. 3 is another close-up cross-sectional view of the filter assembly of FIG. 1.

FIG. 3 shows a close-up cross-sectional view of the filter assembly 100 near the gasket 122. As shown in FIG. 3, the filter element 112 is raised out of the operating position of FIG. 2. The filter element 112 is lifted in this manner during servicing operations when the upper housing 104 is removed (e.g., being spun-off) from the lower housing 102. Accordingly, the extension portion 124 of the second endplate 116 does not block the plurality of openings 126 in the gasket 122. In this arrangement, fluid flows out of the lower housing 102 back to the fluid storage tank through the plurality of openings 126 and the drainage outlet 204 along the flow path 302. Accordingly, during removal of the filter element 112 from the housing, remaining filtered fluid in the housing flows back into the fluid storage tank, which helps to prevent spillage of the fluid from within the housing. Further, because the gasket 122 is part of the central tube 110 and not the filter element 112, the gasket 122 remains connected to the central tube 110 and does not need to be replaced along with the filter element 112 during service.

Figure 4:
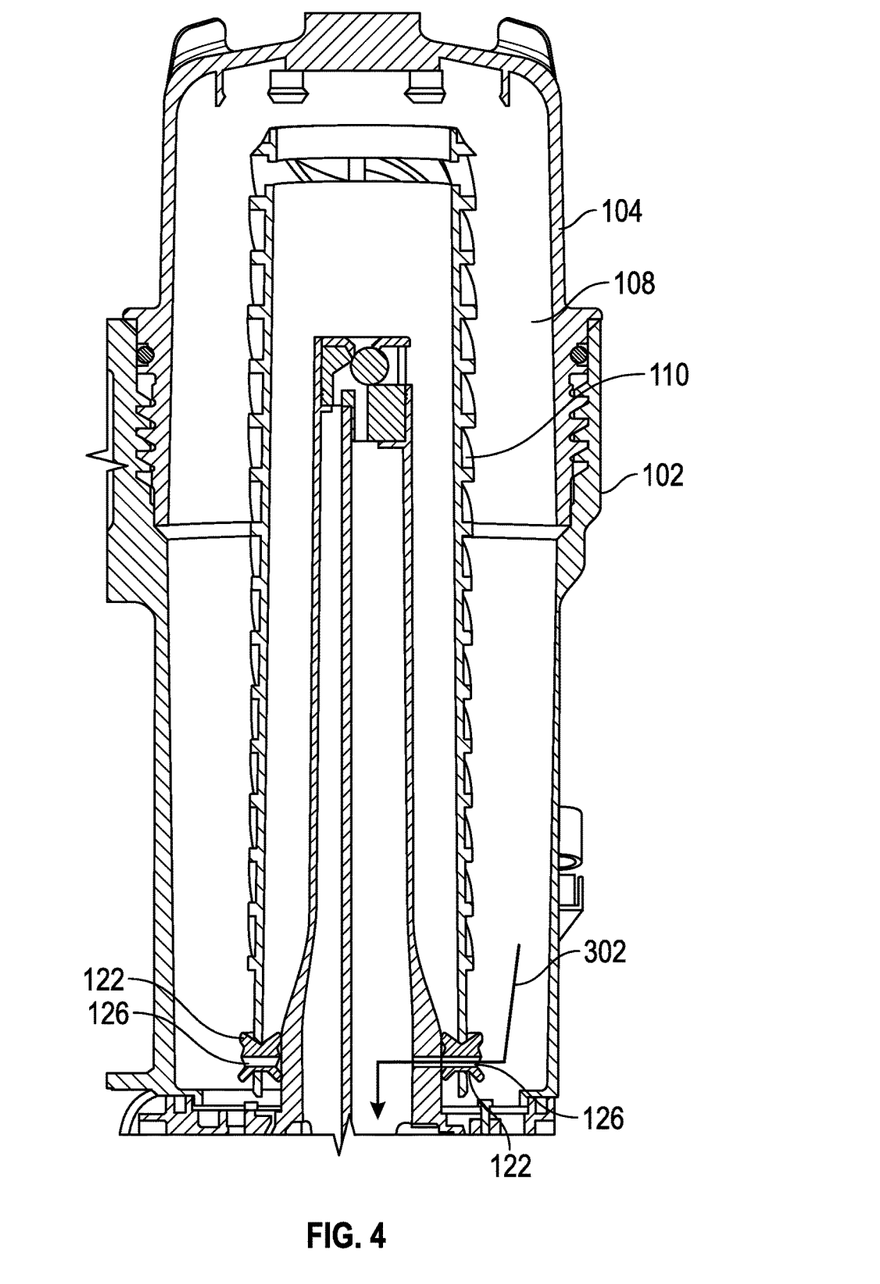
FIG. 4 is a cross-sectional view of the filter assembly of FIG. 1 having the filter element removed.

Referring to FIG. 4, a cross-sectional view of the filter assembly 100 is shown with the filter element 112 removed from the cavity 108. The flow path 302 of the fluid out of the housing and into the fluid storage tank through the plurality of openings 126 in the gasket 122 is clearly shown in FIG. 4.

Figure 5:
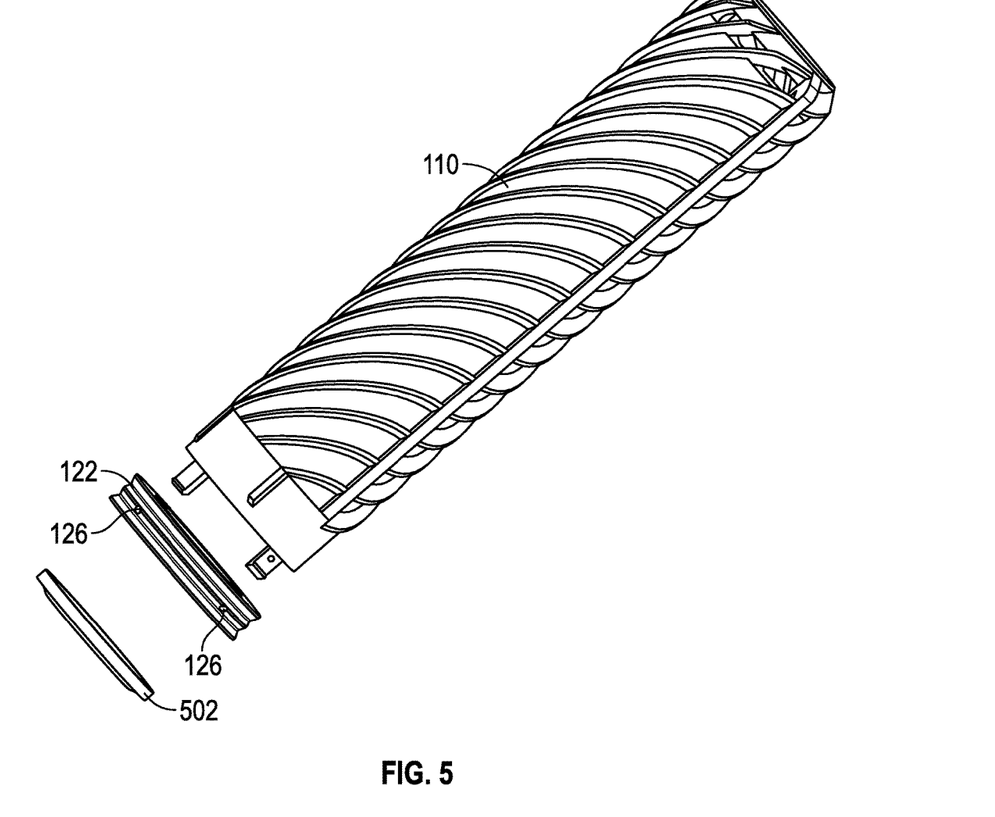
FIG. 5 is an exploded view of the central tube and gasket assembly of the filter assembly of FIG. 1.

FIG. 5 shows an exploded view of the central tube 110 and gasket 122 assembly. The gasket 122 is positioned on a lower end of the central tube 110. The gasket 122 is secured on the lower end of the central tube 110 through a retainer 502. The retainer 502 locks the gasket 122 to the central tube 110 via a snap-fit connection, as shown in further detail in FIGS. 6 and 7.

Figure 6:
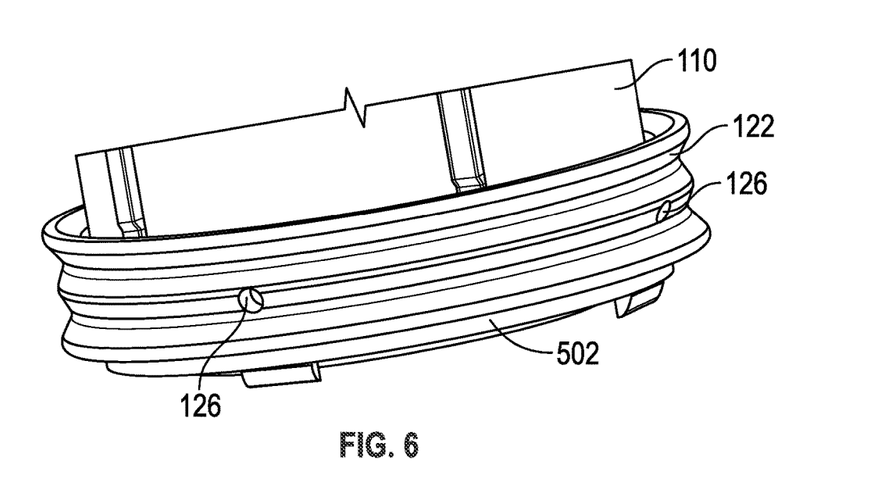
FIG. 6 is a close-up perspective view of the gasket assembled on the central tube of the filter assembly of FIG. 1
Figure 7:
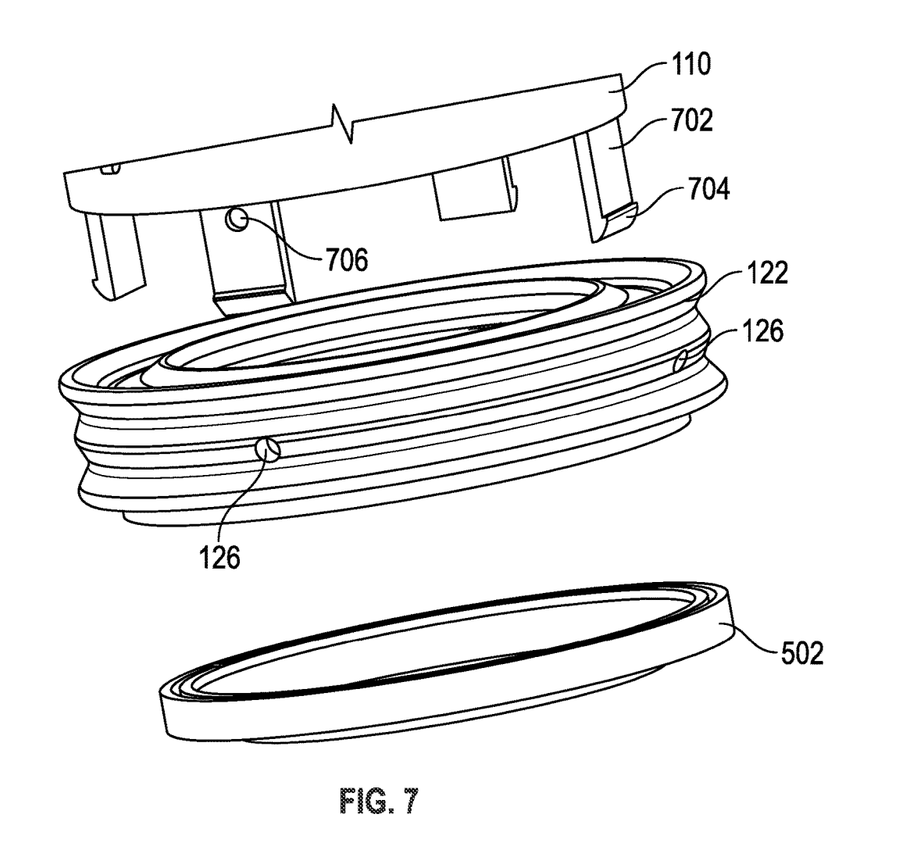
FIG. 7 is a close-up exploded view of the central tube and gasket assembly of the filter assembly of FIG. 1.

FIG. 6 shows a close-up perspective view of the gasket 122 assembled on the central tube 110. FIG. 7 shows a close-up exploded view of the central tube 110 and gasket 122 assembly. As shown in FIG. 7, the lower end of the central tube includes a plurality of tabs 702. Each tab includes a barb 704. In the assembled state, the tabs 702 extend through openings in the gasket 122 and openings in the retainer 502. The tabs 702 and the barbs 704 interact with the retainer 502 to form a snap-fit connection that holds the gasket 122 in place on the lower end of the central tube 110. At least one of the tabs 702 includes a central opening 706. When the gasket 122 is received over the tabs 702, the central opening 706 aligns with at least one of the plurality of openings 126.

Referring to FIGS. 8 through 11, a filter assembly 800 is shown according to an exemplary embodiment. The filter assembly 800 is similar to the filter assembly 100 in all aspects except in that the gasket 802 of the filter assembly 800 differs from the gasket 122 of filter assembly 100. As such, a similar reference numbering scheme is applied to FIGS. 8 through 11 where like parts are found between filter assemblies 100 and 800.

Figure 8:
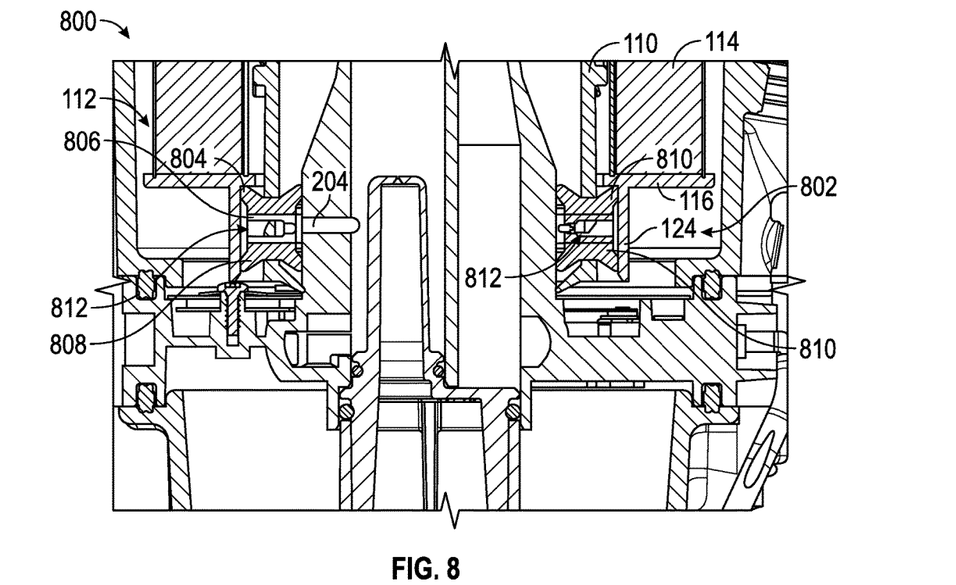
FIGS. 8 and 9 are close-up cross-sectional views of a filter assembly according to another exemplary embodiment.

FIG. 8 shows a close-up cross-sectional view of the filter assembly 800 near the gasket 802. The gasket 802 has a similar overall shape to the gasket 122 of the filter assembly 100. However, unlike the gasket 122, the gasket 802 is a multi-piece piece gasket (e.g., a three-piece gasket). The gasket 802 includes an upper gasket portion 804, an intermediate member 806, and a lower gasket portion 808. The intermediate member 806 is positioned between the upper gasket portion 804 and the lower gasket portion 808. In some arrangements, the upper and lower gasket portions 804 and 808 are comprised of a first material, such as polyurethane or rubber, and the intermediate member 806 is comprised of a second material, such as plastic. In such arrangements, the second material is a harder and/or more rigid material than the first material.

As shown in FIG. 8, the filter element 112 is in the installed or operating position. Both the upper and lower gasket portions 804 and 806 include a lobe 810 that each create a seal against the extension portion 124 of the second endplate 116 when the filter element 112 is in the operating position. The intermediate member 806 includes a plurality of openings 812 that extend through the intermediate member 806. The plurality of openings 812 allow filtered fluid within the housing to pass through the gasket 802 and back into the fluid storage tank during filter service operations. The extension portion 124 blocks the plurality of openings 812 in the intermediate member 806 and prevents the flow of fluid from backtracking back into the fluid storage tank through a drainage outlet 204. Again, while multiple openings 812 are shown in the embodiment of FIG. 8, it is possible for only one opening 812 to be included.

Figure 9:
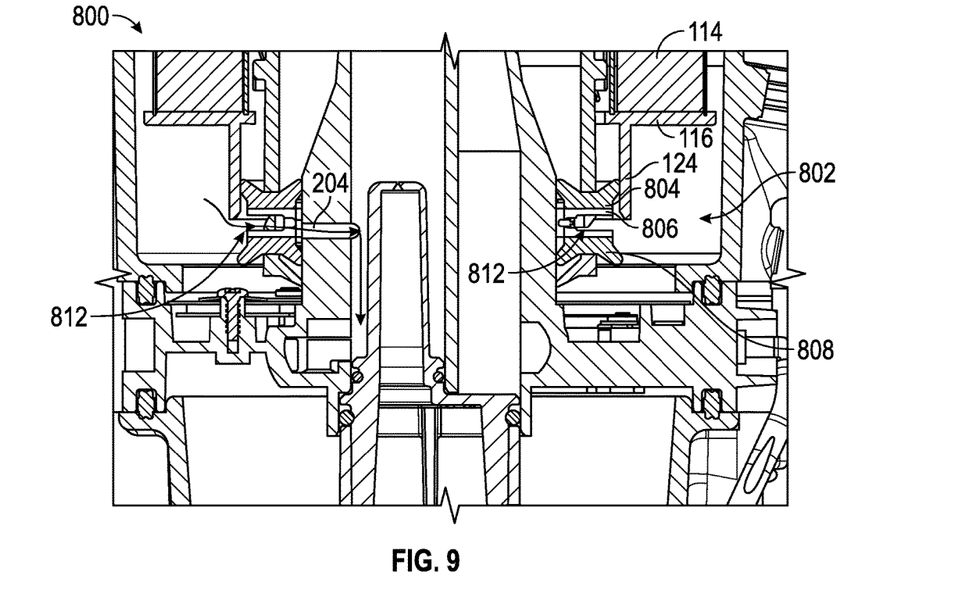

FIG. 9 shows a close-up cross-sectional view of the filter assembly 800 near the gasket 802. As shown in FIG. 9, the filter element 112 is raised from the operating position of FIG. 8. The filter element 112 is lifted in this manner during servicing operations when the upper housing 104 is being spun-off the lower housing 102. Accordingly, the extension portion 124 of the second endplate 116 does not block the plurality of openings 812 in the intermediate member 806. In this arrangement, fluid flows out of the lower housing 102 back to the fluid storage tank through the plurality of openings 126 and the drainage outlet 204 along the flow path 302. Accordingly, during removal of the filter element 112 from the housing, excess fluid flows back to the fluid storage tank to avoid spillage of the fluid within the housing. Further, because the gasket 802 is part of the central tube 110 and not the filter element 112, the gasket 802 does not need to be replaced with each filter element replacement service.

Figure 10:
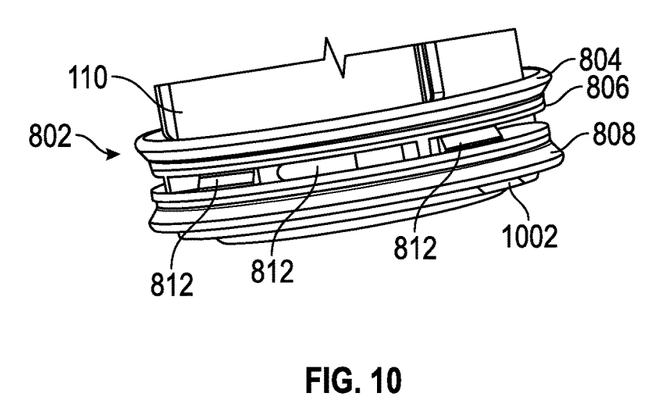
FIG. 10 is a close-up perspective view of the gasket assembled on the central tube of the filter assembly of FIGS. 8 and 9.
Figure 11:
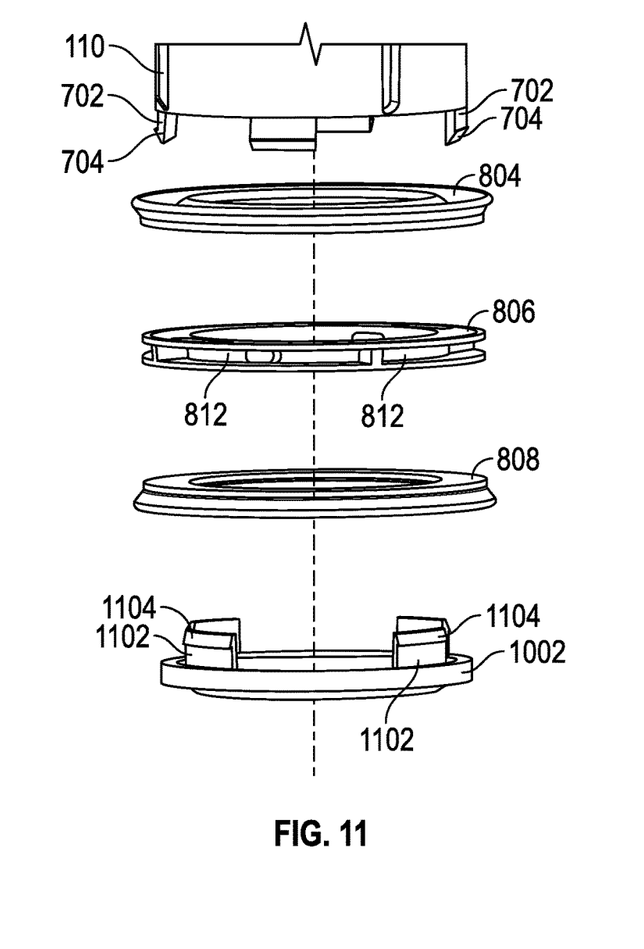
FIG. 11 is a close-up exploded view of the central tube and gasket assembly of the filter assembly of FIGS. 8 and 9.

Referring to FIG. 10 shows a close-up perspective view of the gasket 802 assembled on the central tube 110. FIG. 11 shows a close-up exploded view of the central tube 110 and gasket 802 assembly. As shown in FIG. 10, the gasket 802 is positioned on a lower end of the central tube 110. The gasket 802 is secured on the lower end of the central tube 110 through a retainer 1002. The retainer 1002 locks the gasket 802 to the central tube 110 via a snap-fit connection, as shown in further detail in FIG. 11. The lower end of the central tube includes a plurality of tabs 702. Each tab includes a barb 704. In the assembled state, the tabs 702 extend through openings in the upper gasket portion 804 and into openings in the intermediate member 806. The tabs 702 and the barbs 704 interact with the intermediate member 806 to form a snap-fit connection that holds the upper gasket portion 804 in place on the lower end of the central tube 110. Similarly, the retainer 1002 includes a plurality of tabs 1102, each with a barb 1104. In the assembled state, the tabs 1102 extend through openings in the lower gasket portion 808 and into openings in the intermediate member 806. The tabs 1102 and the barbs 1104 interact with the intermediate member 806 to form a snap-fit connection that holds the lower gasket portion 808 in place on the lower end of the central tube 110. In an alternative arrangement, the tabs 702 extend all the way through the upper gasket portion 804, the intermediate member 806, the lower gasket portion 808, and into the retainer 1002 and form a snap-fit connection with the retainer 1002 that holds each component in place on the lower end of the central tube 110.

Although the above-described filter assembly is described as being a fuel filter assembly, the same gasket arrangement may be applied in other filter assemblies. For example, the same gasket arrangement may be utilized in hydraulic fluid filtering systems, lubricant filtering systems, water filtering systems, and the like. Additionally, the above-described retainers 502 and 1002 are described as utilizing snap-fit connections to retain the respective gaskets 122 and 802 on the central tube 110. However, other connection mechanisms, such as a threaded connection, a bonded connection (e.g., by using epoxy or glue), or other fastening mechanisms may also be used.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:
1. A filter assembly comprising:
a housing having a central tube having a plurality of tabs;
a gasket positioned on the central tube, the gasket including a drain passage extending radially therethrough, the gasket having a sealing lobe, the gasket including a plurality of tab openings extending axially therethrough, wherein each tab of the plurality of tabs extends through a respective tab opening of the plurality of tab openings;

a filter element removably positioned within the housing and around the central tube, the filter element including a filter media and an endcap, the filter media configured to filter a fluid, the endcap including an extension portion that contacts the sealing lobe and forms a seal with the gasket when the filter element is positioned in an operating position within the housing, the extension portion blocking the drain passage when the filter element is positioned in the operating position, and wherein when the filter element is removed from the operating position, the drain passage is not blocked by the extension portion such that the fluid can flow through the drain passage.

2. The filter assembly of claim 1, further comprising a retainer configured to lock the gasket to the central tube.

3. The filter assembly of claim 2, wherein the retainer is coupled to the central tube via a snap-fit connection.

4. The filter assembly of claim 3, wherein the plurality of tabs extend through the gasket to form a connection with the retainer.

5. The filter assembly of claim 4, wherein at least one of the plurality of tabs includes a central opening that aligns with the drain passage.

6. The filter assembly of claim 1, wherein the gasket includes a plurality of drain passages extending therethrough.

7. The filter assembly of claim 1, wherein the endcap is an open endcap that is positioned around the central tube when the filter element is in the operating position.

8. The filter assembly of claim 1, wherein the gasket is a multi-piece gasket and includes an upper gasket portion, a lower gasket portion, and an intermediate member positioned between the upper gasket portion and the lower gasket portion.

9. The filter assembly of claim 8, wherein the drain passage is located in the intermediate member.

10. The filter assembly of claim 8, wherein the upper and lower gasket portions are comprised of a first material and the intermediate member is comprised of a second material, the second material is more rigid than the first material.

11. The filter assembly of claim 8, further comprising a retainer configured to lock the gasket to the central tube.

12. The filter assembly of claim 11, wherein the plurality of tabs include a first plurality of tabs that extend through the upper gasket portion and form a first snap fit connection with the intermediate member.

13. The filter assembly of claim 12, wherein the retainer includes a second plurality of tabs that extend through the lower gasket portion and form a second snap fit connection with the intermediate member.

14. The filter assembly of claim 1, wherein the central tube is a standpipe of a fuel delivery system.

15. The filter assembly of claim 1, wherein the drain passage is in fluid communication with a fluid storage tank.

* * * * *